(12) United States Patent
Jepsen

(10) Patent No.: US 8,384,861 B2
(45) Date of Patent: Feb. 26, 2013

(54) DIFFRACTIVE LIQUID CRYSTAL DISPLAY

(75) Inventor: Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 632 days.

(21) Appl. No.: 12/510,424

(22) Filed: Jul. 28, 2009

(65) Prior Publication Data

US 2010/0026930 A1     Feb. 4, 2010

Related U.S. Application Data

(60) Provisional application No. 61/084,027, filed on Jul. 28, 2008.

(51) Int. Cl.
    *G02F 1/1335*     (2006.01)
    *G02F 1/13*     (2006.01)

(52) U.S. Cl. .......................... 349/114; 349/62; 349/201

(58) Field of Classification Search .......... 349/113–114, 349/201–202, 61–67
See application file for complete search history.

(56) References Cited

U.S. PATENT DOCUMENTS

| 4,850,681 | A | * | 7/1989 | Yamanobe et al. | ........... 349/201 |
| 6,014,197 | A | * | 1/2000 | Hikmet | ........... 349/201 |
| 6,341,002 | B1 | | 1/2002 | Shimizu et al. | |
| 7,008,409 | B2 | | 3/2006 | Spiezio et al. | |
| 7,209,212 | B2 | * | 4/2007 | Chuang et al. | ........... 349/196 |
| 7,358,943 | B2 | | 4/2008 | Asao | |
| 7,388,635 | B2 | | 6/2008 | Aoki | |
| 7,940,340 | B2 | * | 5/2011 | Ludwig et al. | ........... 349/1 |
| 2001/0046142 | A1 | | 11/2001 | Van Santen et al. | |
| 2002/0145688 | A1 | | 10/2002 | Sekiguchi | |
| 2004/0027516 | A1 | | 2/2004 | Liu | |
| 2004/0201560 | A1 | | 10/2004 | Shen et al. | |
| 2004/0252092 | A1 | | 12/2004 | Jurgen | |
| 2006/0044240 | A1 | | 3/2006 | Takizawa et al. | |
| 2006/0227283 | A1 | * | 10/2006 | Ooi et al. | ........... 349/201 |
| 2006/0238679 | A1 | | 10/2006 | Hirai | |

(Continued)

FOREIGN PATENT DOCUMENTS

| CN | 1942812 A | 4/2007 |
| JP | 07-005469 A | 1/1995 |

(Continued)

OTHER PUBLICATIONS

International Searching Authority, "International Search Report and Written Opinion", application No. PCT/US2009/050787, dated Feb. 17, 2010, 10 pages.

(Continued)

*Primary Examiner* — Dung T. Nguyen
(74) *Attorney, Agent, or Firm* — Hickman Palermo Truong Becker Bingham Wong LLP

(57) ABSTRACT

A liquid crystal display (LCD) comprises a light source; a light diffractor over the light source configured to diffract light received from the light source; a liquid crystal diffraction grating over the light diffractor and between liquid crystal pixel structures comprising a plurality of liquid crystal pixels; the liquid crystal diffraction grating has a changed diffraction index in response to application of a voltage differential across the diffraction grating, and when having the changed diffraction index aligns diffracted light received from the light diffractor into aligned light directed toward the liquid crystal pixel structure. An LCD may comprise a plurality of liquid crystal pixels each comprising a reflective part and a transmissive part, the reflective part of at least some of the plurality of liquid crystal pixels comprising a retroreflector configured to reflect at least some light rays, received from an external light source, toward the external light source.

23 Claims, 5 Drawing Sheets

U.S. PATENT DOCUMENTS

| | | |
|---|---|---|
| 2007/0046606 A1 | 3/2007 | Kim et al. |
| 2007/0047221 A1 | 3/2007 | Park |
| 2007/0164953 A1 | 7/2007 | Huang et al. |
| 2007/0242197 A1 | 10/2007 | Watson et al. |
| 2008/0002106 A1 | 1/2008 | Van De Witte et al. |
| 2008/0007952 A1 | 1/2008 | Iwane |
| 2008/0030632 A1 | 2/2008 | Murata |
| 2008/0030656 A1 | 2/2008 | Watson et al. |
| 2008/0074592 A1 | 3/2008 | Araki et al. |
| 2008/0117346 A1 | 5/2008 | Jepsen |
| 2008/0158486 A1 | 7/2008 | Kim et al. |
| 2009/0129116 A1 | 5/2009 | Kim et al. |
| 2009/0244706 A1 | 10/2009 | Levola et al. |
| 2010/0260030 A1* | 10/2010 | Tao et al. ............ 369/112.02 |
| 2012/0120341 A1 | 5/2012 | Lu et al. |

FOREIGN PATENT DOCUMENTS

| | | |
|---|---|---|
| JP | 2003-248221 A | 9/2003 |
| JP | 2004-045757 A | 2/2004 |
| JP | 2004-163893 A | 6/2004 |
| JP | 2004-279765 A | 10/2004 |
| JP | 2004-325790 A | 11/2004 |
| JP | 2005-003758 A | 1/2005 |
| KR | 10-0584085 B1 | 5/2006 |
| TW | 200702846 A | 1/2007 |
| TW | 200823554 A | 6/2008 |

OTHER PUBLICATIONS

Current Claims, application No. PCT/US2009/050787, 4 pages.
International Searching Authority, "International Search Report and Written Opinion", application No. PCT/US2009/051946, dated Mar. 3, 2010, 15 pages.
Current Claims, application No. PCT/US2009/051946, 11 pages.
International Searching Authority, "International Search Report and Written Opinion", application No. PCT/US2009/051950, dated Mar. 15, 2010, 10 pages.
Current Claims, application No. PCT/US2009/051950, 6 pages.
Wu, S.T., et al., "Mixed-Mode Twisted Nematic Liquid Crystal Cells for Reflective Displays", Applied Physics Letters, vol. 68, published Jan. 1996, 3 pages.
Wright, et al., "Resolution and Legibility: A comparison of TFTLCDs and CRTs", SID Digest, 1999, 4 pages.
Yoshitake, et al., "The Relationship between Pixel Density and Readability on Computer Displays- Effectiveness of an Anti-Aliased Front on a High Density LCD", SID Digest, 2003, 4 pages.
International Searching Authority, "International Search Report and Written Opinion", application No. PCT/US2009/051981, dated Feb. 17, 2010, 10 pages.
Current Claims, application No. PCT/US2009/051981, 5 pages.
Office Action in Application No. 098125404, dated Oct. 1, 2012, 9 pages.
Current Claims in Application No. 098125404, dated Oct. 2012, 5 pages.

* cited by examiner

DIFFRACTIVE LIQUID CRYSTAL DISPLAY

BENEFIT CLAIM

This application claims the benefit, under 35 U.S.C. 119 (e), of prior provisional application 61/084,027, filed Jul. 28, 2008, the entire contents of which is hereby incorporated by reference as if fully set forth herein.

CROSS REFERENCE TO RELATED APPLICATIONS

This application is related to U.S. patent application Ser. No. 12/503,793, filed Jul. 15, 2009, issued as U.S. Pat. No. 8,264,645 on Sep. 11, 2012, titled "TRANSFLECTIVE DISPLAY," and U.S. patent application Ser. No. 12/510,485, filed Jul. 28, 2009, issued as U.S. Pat. No. 8,264,646 on Sep. 11, 2012, titled "TRANSFLECTIVE DISPLAY WITH WHITE TUNING," the entire contents of which are hereby incorporated by reference for all purposes as if fully disclosed herein.

TECHNICAL FIELD

The present disclosure relates, in general, to a diffractive liquid crystal display (LCD). More specifically, the disclosure relates to techniques for aligning rays of the backlight of a Liquid Crystal Display (LCD).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The increase in the use of displays in various electronic components has increased the pressure on display manufacturers to provide components that provide better performance. The performance parameters include readability, power consumption, resolution, cost, and sunlight readability. Display manufacturers employ various techniques to improve performance based on these parameters. In the field of liquid crystal displays, there exists a need for a technique that produces a high resolution in LCDs that are roomlight readable with the backlight off, and sunlight readable. Additionally, a need exists to develop an LCD that shows a high resolution in black, white and shades of grey.

Conventional backlit LCDs comprise a light source, such as one or more light-emitting diodes and a light guide. Light rays emitted by the light source are directed in all directions, but liquid crystal materials require light aligned in a single direction if the liquid crystal material is to function as a light valve. Therefore, a linear polarizer is layered over the light source and functions to polarize or align light waves of the light source in a single plane. The polarized light then passes through pixels, color filters, other films, and a second polarizer to produce a visible display image.

Unfortunately, conventional polarizers function by absorbing a large amount of the light waves that are not directed in the plane of polarization. Consequently, polarizers cause loss of a substantial amount of light intensity. Loss of 50% or more of the light produced by the light source is not unusual. A result is that to produce a display with acceptable brightness, the light source must be constructed with sufficient brightness to overcome the loss experienced at the first polarizer. Power consumption is directly related to brightness, and therefore a portion of the power consumed in a conventional LCD is ultimately wasted in the form of light loss in the polarizer.

Further, LCDs with polarizers suffer from reduced or limited reflectance and readability, as the polarizers cause the LCD to appear dim. For example, the second polarizer may absorb as much as 45% of incident or ambient light rays cast upon the LCD, and may absorb as much as 90% of the same rays upon reflection from reflective elements of the LCD. Therefore, in practice it is not possible for an LCD that uses polarizers to mimic closely the appearance of text on paper or to achieve performance similar to e-paper displays.

SUMMARY

In an embodiment, a liquid crystal display (LCD) comprises a light source; a light diffractor over the light source configured to diffract light received from the light source; a liquid crystal diffraction grating over the light diffractor, between liquid crystal pixel structures comprising a plurality of liquid crystal pixels; the liquid crystal diffraction grating has a changed diffractive property in response to application of a voltage differential across the diffraction grating, and when having the changed diffractive property aligns diffracted light received from the light diffractor into aligned light directed toward the liquid crystal pixel structures.

In various embodiments the light diffractor comprises any of a prism film or a second diffraction grating. In an embodiment, the light diffractor is configured to diffract light within a range of specular angles, and the liquid crystal diffraction grating is configured to align diffracted light received in the same range of specular angles.

In an embodiment, the liquid crystal diffraction grating comprises a plurality of grooves and walls having a period ranging from 0.1 microns to 10 microns and having a groove depth ranging from 0.1 microns to 10 microns. In an embodiment, the liquid crystal diffraction grating comprises a plurality of grooves and walls having a period of 0.5 microns and having a groove depth of 2 microns.

In an embodiment, each of the plurality of liquid crystal pixels comprises a reflective part and a transmissive part, wherein the reflective part has only part of a color filter, and at least part of the transmissive part comprises one or more color-filters that mostly or completely cover the transmissive part of the pixel.

In an embodiment, the liquid crystal diffraction grating is over only the transmissive part of each of the plurality of liquid crystal pixels. In an embodiment, the reflective part occupies opposite corners of the plurality of pixels. In an embodiment, the transmissive part is diagonally arranged. In an embodiment, 1% to 50% of the reflective part has a color filter.

In an embodiment, An LCD may comprise a plurality of liquid crystal pixels each comprising a reflective part and a transmissive part, the reflective part of at least some of the plurality of liquid crystal pixels comprising a retroreflector configured to reflect at least some light rays, received from an external light source, toward the external light source.

In an embodiment, the reflective part of all the plurality of liquid crystal pixels comprises the retroreflector. In an embodiment, the retroreflector is configured to reflect, toward the external light source, zero-th order non-diffracted light rays received from the external light source.

In an embodiment, the retroreflector is integrally formed with one or more colorless spacers over the reflective part. In an embodiment, the retroreflector is formed in a thin film transistor (TFT) layer of the LCD.

In an embodiment, an LCD having a retroreflector as described above further comprises a back light source; a light diffractor over the back light source configured to diffract light received from the back light source; a liquid crystal diffraction grating over the light diffractor and under a liquid crystal pixel structure comprising a plurality of liquid crystal pixels; and the liquid crystal diffraction grating is configured to have a changed diffraction index in response to application of a voltage differential across the diffraction grating, and configured when having the changed diffraction index to align diffracted light received from the light diffractor into aligned light directed toward the liquid crystal pixel structure.

In an embodiment, the LCD as described herein forms a part of a computer, including but not limited to a laptop computer, notebook computer, and netbook computer.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

The drawings are not rendered to scale.

DETAILED DESCRIPTION

Techniques for light alignment in a Liquid Crystal Display (LCD) are described. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In an embodiment, an LCD can function without the use of polarizers or polarized light. In an embodiment, the reflectance of the LCD is substantially greater in comparison to conventional displays, and power consumption is less. In an embodiment, the performance of such an LCD approaches that of electronic paper displays such as electrophoretic displays. Embodiments are readily adaptable to manufacturing processes and can achieve display update rates that are sufficiently fast to permit displaying video. Embodiments are applicable to LCD structures that receive light above or below the LCD structures, including LCD panels that receive purely reflective light from above the LCD, panels that use purely transmissive light from a backlight or other internal light source, or transflective panels that receive light from sources both above and below the LCD structures.

1. Structural Overview of Pixel Structures

Figure 1:
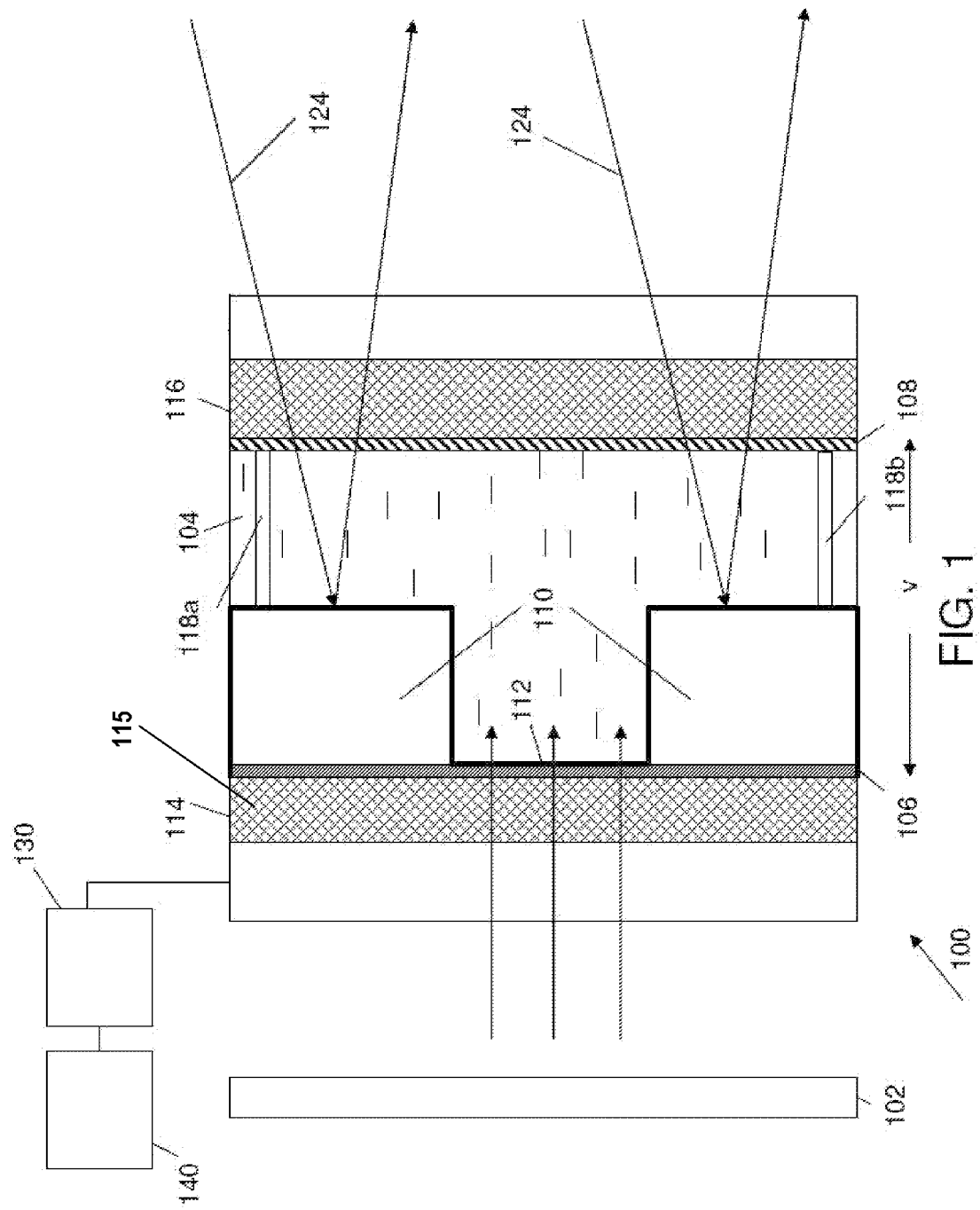
FIG. 1 is a schematic of a cross section of a pixel of an LCD.

FIG. 1 is a schematic of a cross section of a pixel 100 of a LCD. Pixel 100 comprises a liquid crystal material 104, a pixel electrode 106, a common electrode 108, a reflective part 110, a transmissive part 112, substrates 114 and 116, spacers 118a and 118b.

In an embodiment, a light source 102 or an ambient light 124 illuminates pixel 100. Examples of light source 102 include, but are not limited to, Light Emitting Diodes backlights (LEDs), Cold-Cathode Fluorescent Lamps backlights (CCFLs), and the like. Light source 102 comprises a back light source. Ambient light 124 can be sunlight, an external lamp, or any other external source of light. In an embodiment, liquid crystal material 104, which is an optically active material, rotates the axis of the polarization of the light from light source 102 or ambient light 124.

Liquid crystal 104 can be a Twisted Nematic (TN), an Electrically Controlled Birefringence (ECB) and the like. In an embodiment, the rotation of the plane of the light is determined by the potential difference applied between pixel electrode 106, and common electrode 108. In an embodiment, pixel electrode 106 and common electrode 108 can be made of Indium Tin Oxide (ITO). Further, each pixel is provided with a pixel electrode 106, while common electrode 108 is common to all the pixels present in the LCD.

In an embodiment, reflective part 110 is electrically conductive and reflects ambient light 124 to illuminate pixel 100. Reflective part 110 is made of metal and is electrically coupled to pixel electrode 106 thereby providing the potential difference between reflective part 110 and common electrode 108. Transmissive part 112 transmits light from light source 102 to illuminate pixel 100. Substrates 114 and 116 enclose liquid crystal material 104, pixel electrode 106 and common electrode 108. In an embodiment, pixel electrode 106 is located at substrate 114, and common electrode 108 is located at substrate 116. Additionally, substrate 114 comprises switching elements 115. In an embodiment, switching elements 115 can be Thin Film Transistors (TFTs).

A driver circuit 130 sends signals related to pixel values to the switching elements. In an embodiment, driver circuit 130 uses low voltage differential signaling (LVDS) drivers. In another embodiment, a transistor-transistor logic (TTL) interface that senses both increase and decrease in voltages is used in driver circuit 130. Additionally, a timing controller 140 encodes the signals related to pixel values into the signals needed by the diagonal transmissive parts of the pixels. Furthermore, timing controller 140 has a memory to allow self-refresh of the LCD when the signals related to the pixels are removed from timing controller 140.

In an embodiment, spacers 118a and 118b are placed over reflective part 110 to maintain a uniform distance between substrates 114 and 116.

Pixel 100 is illuminated by light source 102 or ambient light 124. The intensity of light passing through pixel 100 is determined by the potential difference between pixel electrode 106, and common electrode 108. In an embodiment, liquid crystal material 104 is in a disoriented state and light is blocked when no potential difference is applied between pixel electrode 106, and common electrode 108. Liquid crystal material 104 is oriented when the potential difference is applied between pixel electrode 106, and common electrode 108. The orientation of liquid crystal material 104 allows the light to pass through.

2. Diffractive LCD for Transmissive Light

Figure 2:
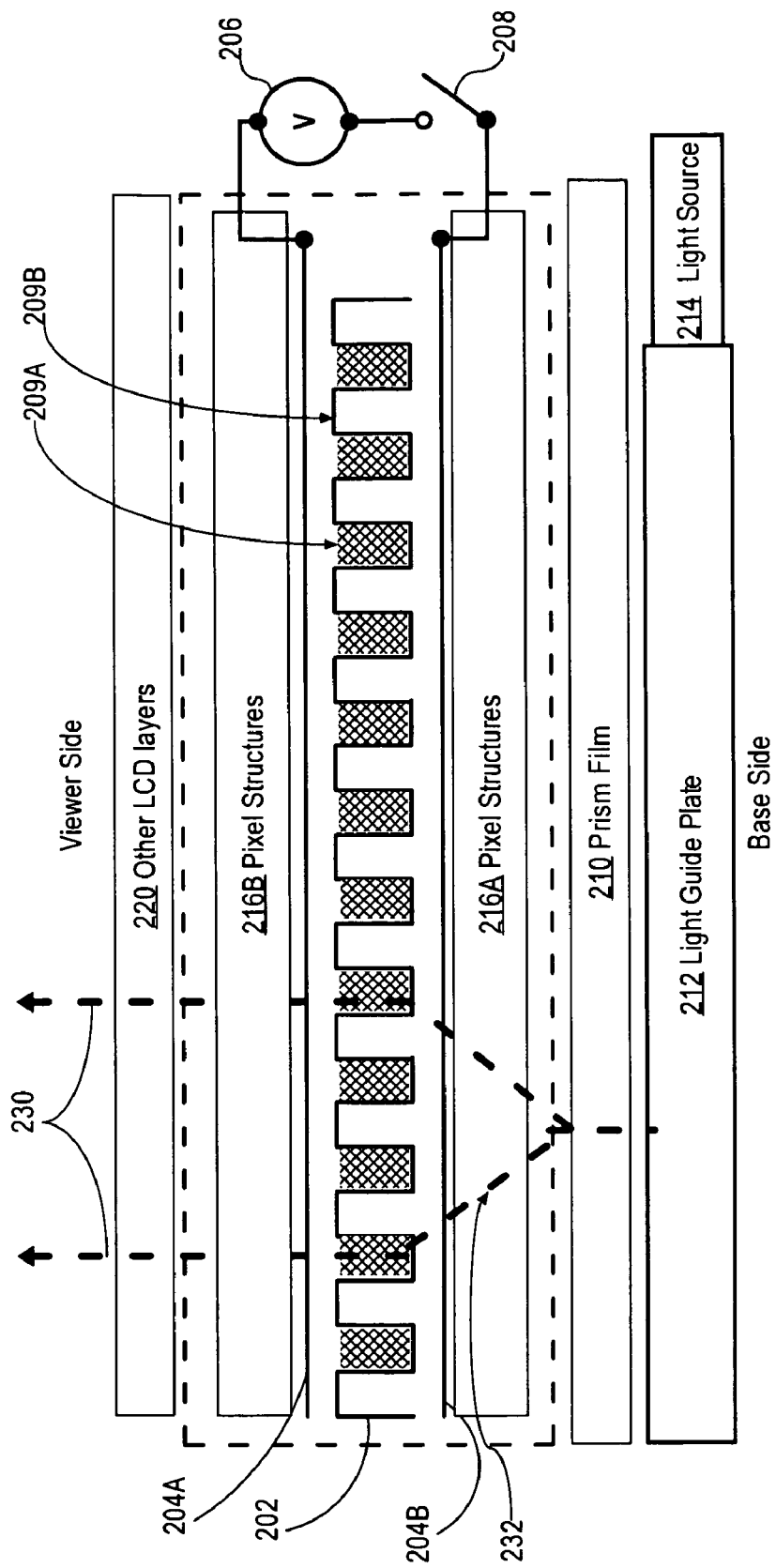
FIG. 2 is a simplified illustration of an LCD having a first diffraction grating for alignment of light rays from a backlight source.

FIG. 2 is a simplified cross section illustration of an LCD having a first diffraction grating for alignment of light rays from a backlight source. For purposes of illustrating a clear example, certain structures are shown in simplified form and other structures are omitted.

FIG. 2 is oriented horizontally, in contrast to the vertical orientation of FIG. 1. Thus, the bottom of FIG. 2 representing a base side of a complete LCD corresponds to the left side of FIG. 1, and the top side of FIG. 2, representing the side from which a viewer views the display, corresponds to the right side of FIG. 1.

In FIG. 2, a light source 214 is coupled to a light guide plate 212 that emits light uniformly dispersed upwardly with respect to the orientation of FIG. 2. In conventional LCDs, the light then passes through a polarizing layer or polarizer before reaching pixel structures 216A, 216B. In an embodiment as in FIG. 2, a light diffractor 210 is positioned over the light guide plate 212 and is configured to diffract light received from the light source 214. In various embodiments, the light diffractor 210 comprises a prism film or a diffraction grating. A first liquid crystal diffraction grating 202 is layered over the light diffractor 210 and in between the pixel structures 216A, 216B and other LCD layers 220. Lower pixel structure 216A may represent or include a TFT layer and a substrate, and upper pixel structure 216B may represent or include color filters. In some embodiments, the pixel structures 216A, 216B and liquid crystal diffraction grating 202 may be integrated in a unitary structure or the diffraction grating may be within a single pixel structure. The other LCD layers 220 may include an upper substrate and various coatings or films. In an embodiment, the liquid crystal diffraction grating is over only the transmissive part of each of the plurality of liquid crystal pixels.

Pixel structures 216A, 216B may comprise liquid crystal material 104, a pixel electrode 106, a common electrode 108, a reflective part 110, a transmissive part 112, substrate 114, and spacers 118a and 118b as shown in FIG. 1. Other LCD layers 220 may represent substrate 116 and other top-level films, coatings or structural layers. Thus the elements of FIG. 2 may be integrated into a pixel structure of the type shown in FIG. 1, or into other LCD pixel structures including triple mode LCDs, transflective LCDs of several designs, and LCDs optimized to act as e-paper.

In an embodiment, diffraction grating 202 comprises a plurality of grooves 209A each filled with a liquid crystal material and a plurality of grating walls 209B that divide and define the grooves. In an embodiment, a combined width of grooves 209A and walls 209B is 0.5 microns and the grooves and walls have a depth of about 2 microns. In various embodiments the period and the depth of the diffraction grating may range from 0.1 to 10 microns. The particular liquid crystal material in grooves 209A is not critical and a variety of conventional LC materials, of the types commonly used in displays, may be used. A grating of the type shown in FIG. 2 has been found to exhibit high diffraction efficiency (over 90% in an embodiment) over the full visible spectrum of light, for example, 400 to 700 nanometers in frequency, at a variety of input angles. Input angles are typically 60 degrees +/−20 degrees.

Viewed in a plan view the diffraction grating 202 may comprise elongated linear liquid crystal grooves 209A divided by elongated linear walls 209B. In various embodiments involving rectangular LCD panels or modules, the elongated length of grooves 209A and walls 209B may be oriented either parallel to or perpendicular to an elongated side of the LCD panel.

In embodiments, diffraction grating 202 is formed of glasses or oxides on which grooves are exposed using chemical etching, laser etching and other methods. Diffraction grating 202 further comprises first and second electrodes 204A, 204B overlying top and bottom sides of the diffraction grating and respectively coupled to poles of a voltage source 206 through a switch 208, which may comprise a transistor, circuit, or integrated electronics. Thus the voltage source 206 may be selectively applied to the electrodes 204A, 204B, causing development of a voltage potential difference between the electrodes. In an embodiment, grooves 209A normally have a first diffractive index when no voltage is applied and that causes the diffraction grating 202 to be transparent.

In an embodiment, when no voltage is applied from voltage source 206, a diffractive index of the liquid crystal material in grooves 209A matches a diffractive index of the remainder of the grating and therefore the grating appears to a viewer as a uniform sheet of material. When voltage is applied from voltage source 206 by closing switch 208, the diffraction index of the liquid crystal material becomes different than the remainder of the grating; consequently, light entering the grating is diffracted. Further, light from a wide range of input angles is diffracted.

Operation of the LCD of FIG. 2 in connection with transmissive LCDs, or the transmissive part of the LCD, proceeds as follows. The light diffractor 210 is constructed to cause diffraction of light received from light guide plate 212. The light rays 230 emitted from light guide plate 212 exit the guide plate at an angle of about 60 degrees and are diffracted into a spectral dispersion of angled light rays at angles of about 40 to 140 degrees upon exiting the light diffractor 210 as indicated by angled line segments 232 of FIG. 2. In an embodiment, the light diffractor 210 is configured to diffract red light at the shallowest angle toward the diffraction grating 202 and blue light at a steepest angle. In an embodiment, light diffractor 210, which can be either a prism film or a diffraction grating, is formed to provide diffraction or refraction angles that closely compensate for the diffraction of light caused by the diffraction grating 202, which diffracts red to the steepest angle and blue to the shallowest angle.

A voltage is applied to electrodes 204A, 204B causing the diffraction grating 202 to diffract light entering it. An optical principle is that white light entering a prism and emerging as refracted light may be recombined into white light using a second prism. Therefore in FIG. 2 the light rays 230 enter the diffraction grating 202 in a spectral dispersion and emerge aligned as white light as indicated by the straight vertical portions of the rays 230 in FIG. 2.

If pixel structures 216A, 216B include color filters over the transmissive portions of the pixels, then the light is further filtered into red, green and blue pixels. Alternatively the combination of light source 214, light guide plate 212, light diffractor 210 and liquid crystal diffraction grating 202 may be used in a monochrome display without color filters.

Thus the embodiment of FIG. 2 provides an LCD structure in which light from light source 214 may be effectively aligned before reaching pixel structures 216A, 216B without using a polarizer and without incurring light losses associated with polarizers. Because walls 209B are relatively narrow (typically 0.25 micron in width) any loss of light caused by rays reflecting off the walls without passing through the diffraction grating 202 is relatively small. Less power is required for light source 214 than in LCDs using polarizing layers. In an embodiment, about three times less power is expected to be consumed in an LCD that uses the diffraction grating arrangement of FIG. 2 as compared to polarizing layers.

3. Diffractive LCD for Reflected Light

Figure 3:
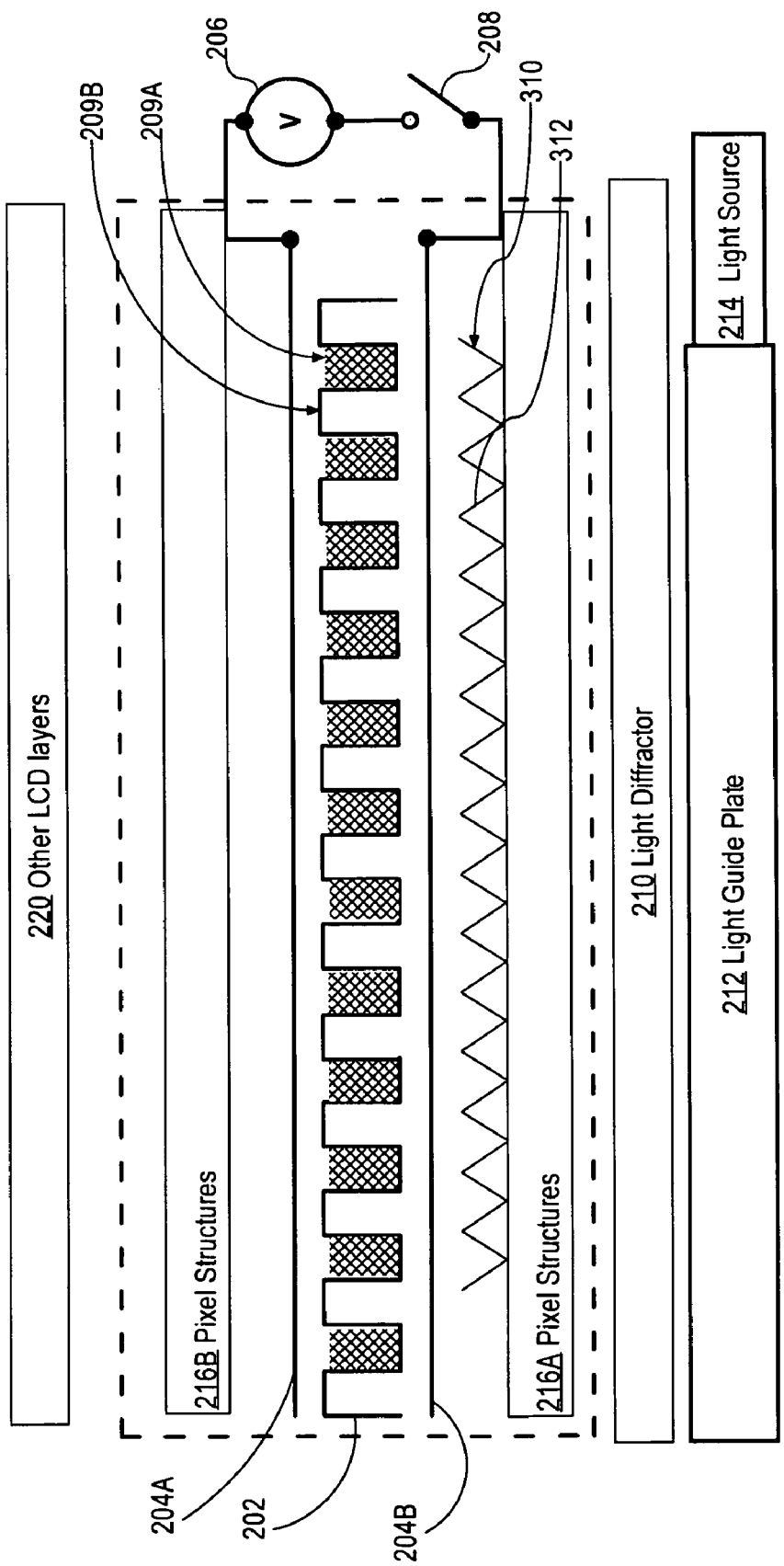
FIG. 3 is a simplified illustration of an LCD having a retroreflector that correct effects of reflected light.

FIG. 3 is a simplified illustration of an LCD having a retroreflector that correct effects of reflected light.

Figure 5:
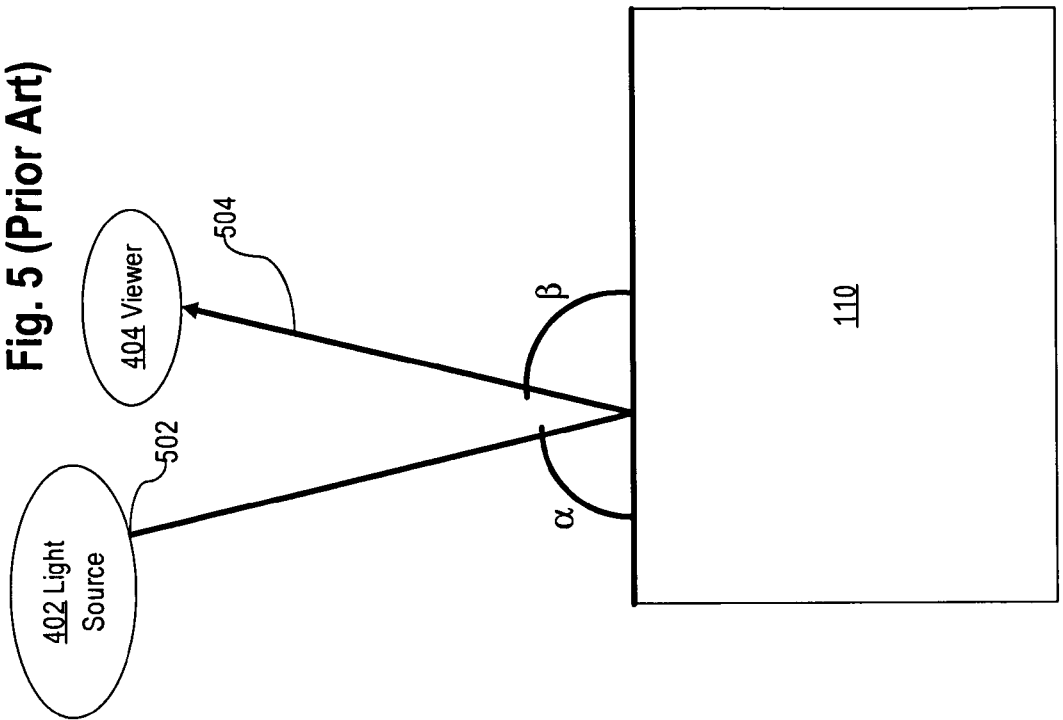
FIG. 5 is a simplified illustration of a reflective part of a pixel using a conventional flat, smooth reflector.

In an LCD operating solely in reflective mode, pixels are made visible by reflection of light from a light source for which the angle of illumination typically cannot be controlled. Such external light sources may include the sun, fixed overhead lighting in building interiors, lamps, and other sources. In this environment, light rays from the light source that are non-diffracted, or zero-th order diffracted rays, may be reflected directly at the viewer. FIG. 5 is a simplified diagram illustrating the problem in the context of a reflective part of a pixel using a conventional flat, smooth reflector. A light source 402 emits light in all directions including some rays of zero-th order represented by ray 502. Ray 502 strikes reflective part 110, which has a flat upper surface. The angle of incidence α equals the angle of reflectance β so that ray 504 is reflected directly to viewer 404 and is perceived as a bright point or hot spot in the displayed image. This effect is undesirable and reduces the effectiveness of an LCD operating without a backlight or transmissive illumination.

In an embodiment, a second diffraction grating could be used on reflective part 110 and comprising a chirped grating in which the period of the grooves varies gradually from a specified maximum width to a specified minimum over a single pixel area; a gradual increase or decrease may be used in various embodiments. The chirped grating may comprise a liquid crystal diffraction grating or a non-LC diffraction grating. Alternatively the second diffraction grating may comprise grooves having a period value that is selected pseudo-randomly or randomly to created white light or near white-diffraction in reflection. This approach would diffract most light from the external light source into a spectral dispersion that does not cause hot spots, but does not fully address the zero-th order light rays that are not diffracted and can cause hot spots in a display that does not use a polarizer or polarizing layer.

In an embodiment, the LCD of FIG. 3 further comprises a retroreflector 310, comprising a plurality of corner cubes having angled or pointed reflective surfaces 312 joined in a linear series so that the retroreflector reveals a zigzag profile or series of triangles in cross section. In various embodiments, the angles of surfaces 312 may vary so that the base widths and base angles of triangles seen in cross section will vary. Such variation causes diffraction in a randomized way for light at an order not equal to zero, while reflecting zero-th order rays back to the light source, as further described. The angle at which adjacent reflective surfaces 312 are joined is not critical and may range from 0.1 to 90 degrees in various embodiments.

In an embodiment, retroreflector 310 is formed only over reflective parts 110 of pixels in pixel structures 216A, 216B. In an embodiment, retroreflector 310 is formed with pixel structures 216A, 216B, for example, using the spacers 118a, 118b. Alternatively the retroreflector 310 may be formed in the TFT layer of the LCD. Alternatively the reflective parts 110 may be formed using a bumpy metal layer that takes the form of a retroreflector structure.

Figure 4:
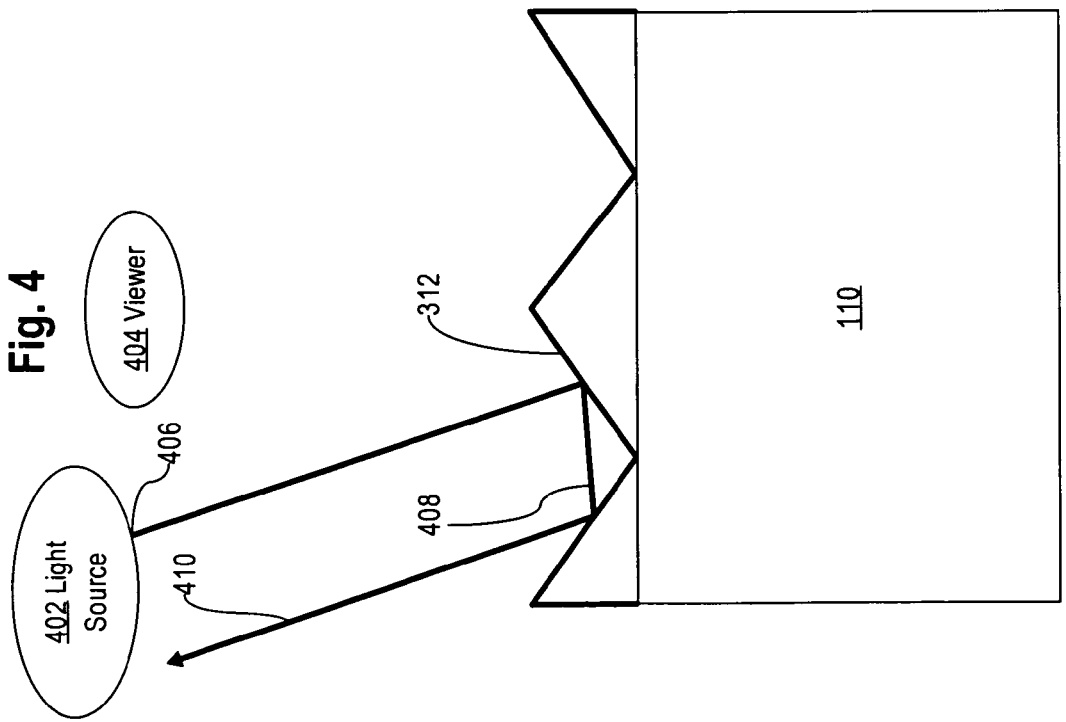
FIG. 4 is a simplified illustration of a reflective part of a pixel using a retroreflector.

In operation, using retroreflector 310 any undiffracted light is reflected back toward the light source and thus appears black to the viewer. FIG. 4 is a simplified diagram illustrating a reflective part of a pixel using a retroreflector. In this arrangement, light ray 406 from light source 402 strikes one of the angled reflective surfaces 312 of retroreflector 310. The angle of incidence of the ray 406 at surface 312 again will equal an angle of reflection of the light ray away from the surface, causing the ray to exit the retroreflector at an angle directed away from the viewer and toward the light source 402 as indicated by ray segment 410. Rays 406, 410 will be parallel and not perceived by the viewer or perceived as black. Consequently, the LCD exhibits superior reflection clarity in conditions of bright ambient light and without backlighting.

4. Computer Displays

Embodiments may be used in a variety of LCD applications. In an embodiment, an electronic apparatus comprises a processor and an LCD formed as described above in connection with FIG. 1 to FIG. 5. Examples of apparatus include video monitors, televisions, watches, clocks, and signs.

Further, embodiments may comprise computing devices such as laptop computers, notebooks, netbooks, handheld computers, personal digital assistants, cell phones, and other computers having an integral LCD that is formed as described herein and coupled to display driver circuitry that the computer can drive to cause a display.

Figure 6:
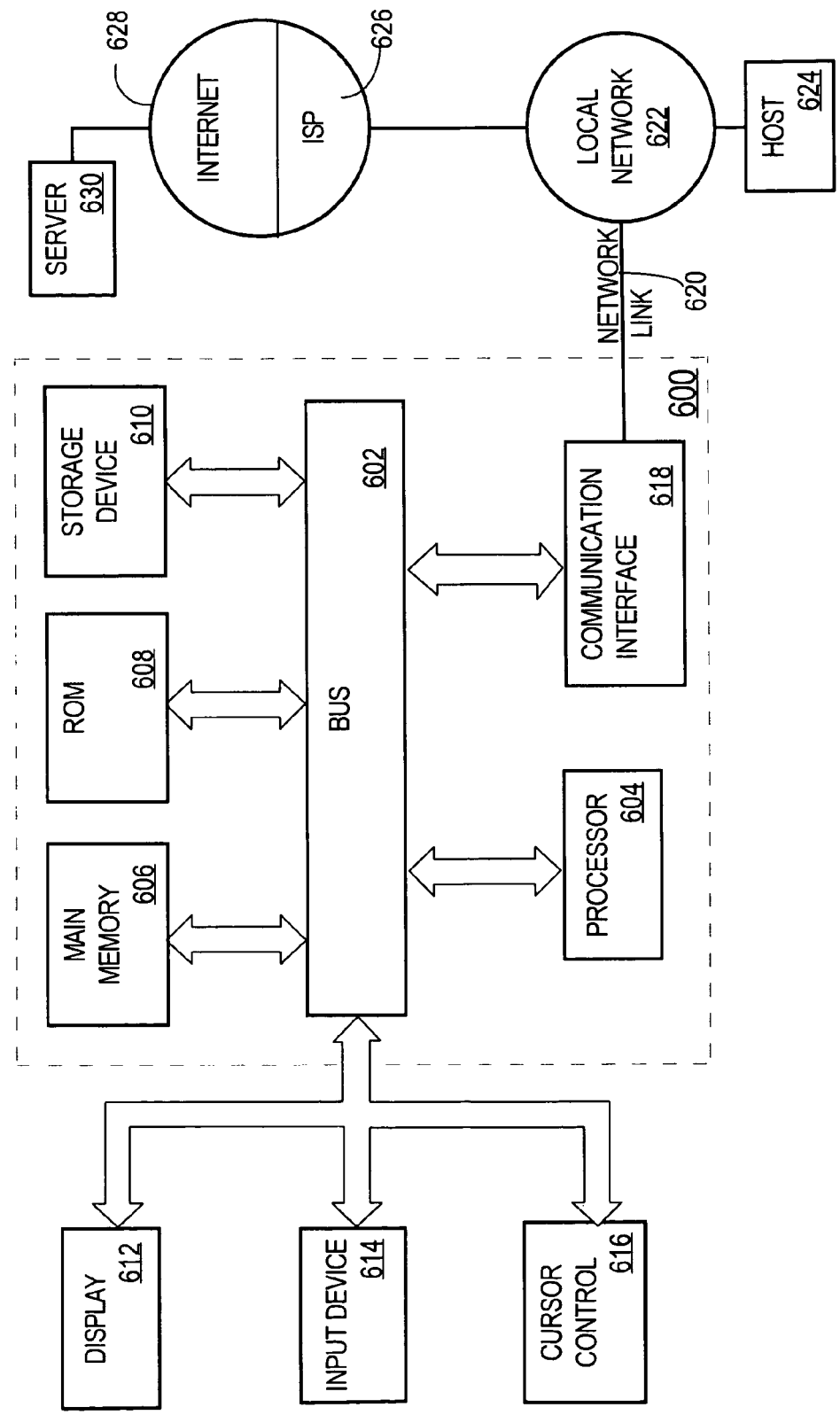
FIG. 6 illustrates a computer with which embodiments may be used.

For purposes of illustrating a clear example, FIG. 6 illustrates a computer system 600 with which embodiments may be implemented. In various embodiments, computer system 600 may comprise any of a laptop computer, notebook, netbook, handheld computer, personal digital assistant, cell phone, or another computer having an integral LCD. Special-purpose computing devices such as cell phones comprise additional hardware elements that are omitted in FIG. 6 for clarity, such as an antenna and cellular radiotelephone transceiver.

Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a liquid crystal display 612. The embodiments of FIG. 1, FIG. 2, FIG. 3, FIG. 4 may be used with display 612. Computer system 600 may comprise a display driver circuit or chipset, separate or integrated with processor 604, configured to drive display 612 with individual LCD pixel display signals based on data that processor 604 writes to the display driver, or obtained directly from a specified part of main memory 606 to which the processor 604 writes data for display. Driver circuit 130 and timing controller 140 may be coupled to processor 604, for example, and to display 612.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

5. Extensions and Alternative

Embodiments may be integrated into a transflective LCD of the type described in prior U.S. patent application Ser. No. 12/503,793, filed Jul. 15, 2009. Embodiments may be integrated into a triple mode LCD of the type described in U.S. Patent Application No. N, filed Jul. 28, 2009.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A liquid crystal display (LCD) comprising:
a light source;
a light diffractor over the light source configured to diffract light received from the light source;
a liquid crystal diffraction grating over the light diffractor and between liquid crystal pixel structures comprising a plurality of liquid crystal pixels;
wherein the liquid crystal diffraction grating is configured to have a changed diffractive property in response to application of a voltage differential across the diffraction grating, and configured when having the changed diffractive property to align diffracted light received from the light diffractor into aligned light directed toward the liquid crystal pixel structures;
wherein the plurality of liquid crystal pixels each comprises a reflective part and a transmissive part;
the reflective part of at least some of the plurality of liquid crystal pixels comprising a retroreflector configured to reflect at least some light rays, received from an external light source, toward the external light source.

2. The LCD of claim 1 wherein the light diffractor comprises any of a prism film or a second diffraction grating.

3. The LCD of claim 1 wherein the light diffractor is configured to diffract light within a range of specular angles, and wherein the liquid crystal diffraction grating is configured to align diffracted light received in the same range of specular angles.

4. The LCD of claim 1 wherein the liquid crystal diffraction grating comprises a plurality of grooves and walls having a period ranging from 0.1 microns to 10 microns and having a groove depth ranging from 0.1 microns to 10 microns.

5. The LCD of claim 1 wherein the liquid crystal diffraction grating comprises a plurality of grooves and walls having a period of 0.5 microns and having a groove depth of 2 microns.

6. The LCD of claim 1 wherein each of the plurality of liquid crystal pixels comprises a reflective part and a transmissive part, wherein the reflective part has only part of a color filter, and at least part of the transmissive part comprises one or more color-filters that mostly or completely cover the transmissive part of the pixel.

7. The LCD of claim 6 wherein the reflective part occupies opposite corners of the plurality of pixels.

8. The LCD of claim 6 wherein the transmissive part is diagonally arranged.

9. The LCD of claim 6 wherein 1% to 50% of the reflective part has a color filter.

10. The LCD of claim 1 wherein the reflective part of all the plurality of liquid crystal pixels comprises the retroreflector.

11. The LCD of claim 1 wherein the retroreflector is configured to reflect, toward the external light source, zero-th order non-diffracted light rays received from the external light source.

12. The LCD of claim 1 wherein the retroreflector is integrally formed with one or more colorless spacers over the reflective part.

13. The LCD of claim 1 wherein the retroreflector is formed in a thin film transistor (TFT) layer of the LCD.

14. A computing device comprising:
one or more processors;
a liquid crystal display comprising a light source, a light diffractor over the light source configured to diffract light received from the light source, and a liquid crystal diffraction grating over the light diffractor and under a liquid crystal pixel structure comprising a plurality of liquid crystal pixels;
wherein the liquid crystal diffraction grating is configured to have a changed diffraction index in response to application of a voltage differential across the diffraction grating, and configured when having the changed diffraction index to align diffracted light received from the light diffractor into aligned light directed toward the liquid crystal pixel structure;
a liquid crystal display (LCD) coupled to the one or more processors and comprising the plurality of liquid crystal pixels and wherein the plurality of liquid crystal pixels each comprises a reflective part and a transmissive part;
the reflective part of at least some of the plurality of liquid crystal pixels comprising a retroreflector configured to reflect at least some light rays, received from an external light source, toward the external light source.

15. The computing device of claim 14 wherein the light diffractor comprises any of a prism film or a second diffraction grating.

16. The computing device of claim 14 wherein the light diffractor is configured to diffract light within a range of specular angles, and wherein the liquid crystal diffraction grating is configured to align diffracted light received in the same range of specular angles.

17. The computing device of claim 14 wherein the liquid crystal diffraction grating comprises a plurality of grooves and walls having a period ranging from 0.1 microns to 10 microns and having a groove depth ranging from 0.1 microns to 10 microns.

18. The computing device of claim 14 wherein the liquid crystal diffraction grating comprises a plurality of grooves and walls having a period of 0.5 microns and having a groove depth of 2 microns.

19. The computing device of claim 14 comprising any of a laptop computer, notebook, netbook, handheld computer, personal digital assistant, or cell phone.

20. The computing device of claim 14 wherein the reflective part of all the plurality of liquid crystal pixels comprises the retroreflector.

21. The computing device of claim 14 wherein the retroreflector is configured to reflect, toward the external light source, zero-th order non-diffracted light rays received from the external light source.

22. The computing device of claim 14 wherein the retroreflector is integrally formed with one or more colorless spacers over the reflective part.

23. The computing device of claim 14 wherein the retroreflector is formed in a thin film transistor (TFT) layer of the LCD.

* * * * *